Aug. 23, 1938.  W. H. O'BRIEN  2,127,829

METHOD OF PRODUCING COLOR EFFECTS IN PHOTOGRAPHY

Filed April 28, 1936

INVENTOR.
Willis H. O'Brien
BY Lyon & Lyon
ATTORNEYS

Patented Aug. 23, 1938

2,127,829

UNITED STATES PATENT OFFICE 2,127,829

METHOD OF PRODUCING COLOR EFFECTS IN PHOTOGRAPHY

Willis H. O'Brien, Los Angeles, Calif.

Application April 28, 1936, Serial No. 76,775

2 Claims. (Cl. 88—16.4)

My invention relates to color photography and has particular reference to a method and apparatus for producing certain color effects in photography and particularly in motion picture photography.

In making photographs in natural colors, and particularly in making motion pictures in natural colors, it is the common practice to photograph a scene with a color camera, which camera registers on one or more separate films the various images, and their color values, so that the finished film or photograph reproduces these images in their natural colors.

As will be understood by those skilled in the art, the art of color photography, and particularly of motion picture color photography is very well developed, and includes various methods of obtaining the images of various color values and for the reproduction of such images in their natural colors. For purposes of illustrating the application of my invention to color photography, I shall refer to one of the well-known methods which consists in photographing an image simultaneously on a plurality of separate films, each film being adapted to register the image and certain of the color values of the objects which is photographed, the light transmitted to each film being passed through color filter apparatus which allows the selected color values to register on that particular film and the separate films are then developed and colored and placed together to reproduce the image in its complete color values.

In order to distinctly register the various color values of an object upon the films, it is necessary to either have the objects in a very strong light or to make the exposures over relatively long periods of time in order to allow the film to properly register the colors and it follows that in photographing outdoor scenes, for example, the amount of light required is present only during a relatively short time of the day so that it has heretofore been necessary to make all of the exposures during this short brightly lighted period. Moreover, in motion picture color photography, even such brightly lighted periods of the day have not been adequate for the proper photographing of objects in fairly rapid motion since the exposures, in order to reproduce the motion, must be made relatively short and such short exposures do not provide for the transmission of adequate light for the proper registration of the color values.

It is, therefore, an object of my invention to provide a method and apparatus for producing images in color, wherein black and white images are produced and in which the color values are added in the laboratory to produce color values stronger than those possible to obtain by direct photographing of such objects with a color camera.

Another object of the invention is to provide a method of photographing objects in relatively rapid motion without loss of delicate color values which would need to be registered by a direct photographing of such moving objects by the color camera.

Another object of the invention is to provide a method of reproducing images in color of rapidly moving objects in which such objects may be photographed under adverse light conditions and in which color may be added to the images in the laboratory.

Another object of the invention is to provide a method and apparatus for producing photographs in natural colors, wherein certain portions of the images may be photographed under strong artificial light while other portions of the images may be photographed in black and white and added to the remaining images with the addition of color to such black and white images to produce a composite color photograph of the entire scene in natural colors.

Other objects and advantages may be apparent from a study of the following specifications, read in connection with the accompanying drawing, wherein Figure 1 is a diagrammatic view, illustrating the apparatus required for the practice of my invention;

Figure 1:
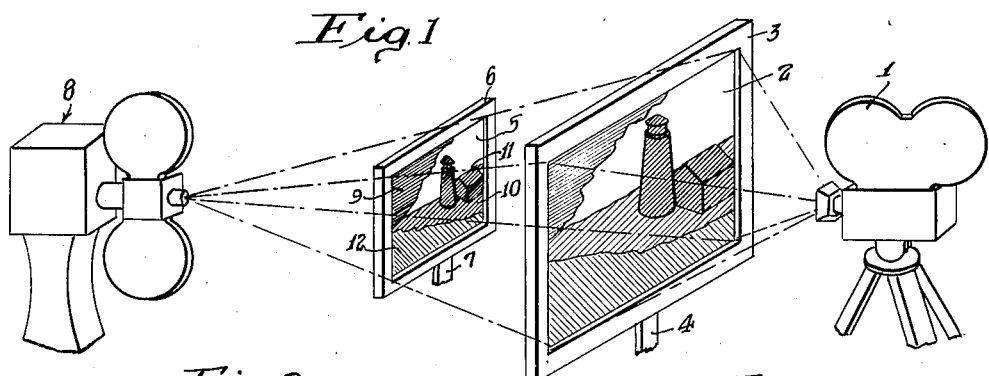

Referring to the drawing, I have illustrated in Fig. 1 a color camera 1 which may be of any well-known type, wherein images photographed by it will be registered upon a film in desired color values. Disposed immediately in front of the color camera 1 is a screen 2 which may be, and preferably is, formed from a sheet of translucent glass supported in a suitable frame 3 upon a stand or other stationary support 4. The distance between the camera 1 and the screen 2 may be selected such that the image registered upon the film in the camera will be an image of the complete area of the screen 2. Disposed behind the screen 2 is a second screen 5 which likewise is preferably formed of a sheet of transparent glass, supported in a frame 6 mounted upon a stand 7 or other stationary supporting structure. At the rear of the screen 5 is a projector 8 which may be of any well-known type capable of projecting an image from a single film upon the screen 2. The distance between the screen 2 and the projector 8 is such that the image projected from the projector will be focused sharply upon the screen 2.

Assuming that it is desired to produce a colored photograph or motion picture of a scene, for example the scene illustrated on the screen 2, consisting of a point of land on which is a light-house and a small building, the foreground showing water and the background showing sky and clouds, it will be understood that to photograph the natural scene required the transportation of a color camera to the location of the desired scene together with a crew of workmen to take such picture and that such picture must be made during that portion of the day at which the strongest possible light is present. In other words, to photograph a relatively short outdoor scene might consume several days in finding the exact light condition under which such scene would properly register in the color camera with all of the strong and delicate color values properly balanced therein. Moreover, even though the most ideal light conditions might finally be achieved, the motion of the water might be so rapid that the distinctness of the images of the moving water might have to be sacrificed in order to achieve the necessary length of exposure for the registration of the color values. A colored photograph of such scene may be adequately and beautifully produced by photographing the actual scene with an ordinary motion picture camera, registering the same in black and white thereon, and adding the colors to the scene in the studio or laboratory. The black and white photograph may be taken at substantially any time during the day, since films for black and white photographs are available which will obtain clear and distinct images with a minimum of exposure time and a minimum of light.

Assuming that such black and white photograph of the desired scene has been obtained, a positive of the black and white film may be produced by the ordinary methods and placed in projector 8 and the image of such scene projected by the projector 8 upon the screen 2. Such scene projected upon the screen 2, however, would be only a black and white image. Now by interposing the screen 5 between the screen 2 and the projector 8 the screen 5 may be provided with a plurality of color filters or color screens, each of which registers with a portion of the scene projected upon the screen 2, and such color filters or screens may be selected of the desired colors and intensity to produce a colored image on the screen 2 with each of the elements in the same color to a desired color or value. For example, a section of the screen 5 may have a thin sheet of pale blue cellophane, gelatine or other transparent coloring material secured thereon, as indicated at 9, the shape of this piece of gelatine or coloring material being cut to fit that portion of the scene projected upon the screen 5 which represents the blue sky of the background.

Another section of color filter material 10 may be cut and fitted upon the screen 5 to add the desired color for the ground or land shown in the image, for example, brown. Another section of color filter material 11 may be cut and fitted to the screen to produce the desired color of the light-house and building, for example a darker shade of brown. A still further section of color filter material 12 may be fitted to the screen 5 over that part of the screen through which the image of the water is projected, for example a blue screen. The resulting image produced upon the screen 2 will be an image of the entire scene in which each element of the entire scene is colored with the color shades or values, and in which the motion of the water is distinctly reproduced. Now by operating the projector 8 and the camera 1 in synchronism with each other, the motion of the water may be reproduced upon the screen 2 with any desired rapidity, and as will be understood such motion may be sufficiently slow and the light produced by the projector may be of sufficient intensity to be sure that the color camera will register not only the motion of the various parts of the image but also will accurately register the color values.

It will also be noted that if the intensity of color of any part of the image is not sufficient to properly register upon the color film in the camera additional color may be added by merely adding more color filter material to that section of the screen 5 through which that portion of the image is projected.

The resulting image produced in the camera 1 will have all of the motion of the original image, no matter how rapid, while, at the same time, the shade values and intensity of the various colors will be produced in the most desirable effects.

While the foregoing description illustrates how a complete series of colors may be added to a black and white photograph of an object or scene the same principle may be applied to the production of more complicated scene in motion picture photography.

In the production of certain types of motion pictures or photoplays, a considerable amount of the action of the picture or photo play will occur at one portion of the complete scene, usually in the foreground of the scene. To produce a colored photograph of such scene it has heretofore been necessary to find a particular location which fitted the scene and then transport the entire crew of cameramen, technicians, directors and actors to such location to photograph the desired scene.

Again it will be noted that not only must a great number of persons be transported to the desired location, but the amount of actual time during any given day during which the light intensity is sufficient for the production of the picture, is limited so that many days elapse in the making of a comparatively simple scene with the attendant enormous cost.

By using my method, however, the foreground portion of the desired scene may be constructed by artificial sunlight indoors on a sound stage and the actors may go through their parts on this artificial scene, a color camera photographing such artificial scene and the actors, while any desired intensity of artificial light is projected upon the scene. The background portion of the scene may be prevented from registering upon the color film in the color camera by using a black or other color-absorbing back drop immediately to the rear of the artificial scene. The color film in the camera now has registered thereon the foreground artificial scenery and the action of the actors in which the intensity of light has been sufficient to accurately register all of the color values of this part of the scene upon the color film. Now an artificial background may be added, even one containing motion, for example, moving water, by photographing on a separate film, with an ordinary black and white camera a desired ocean scene, including the moving water and sky, trees or other desired background objects.

Figure 2:
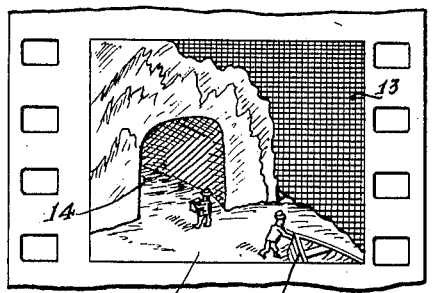
Fig. 2 is a view of a portion of a finished color film upon which is registered a portion of a scene taken under strong artificial light.
Figure 3:
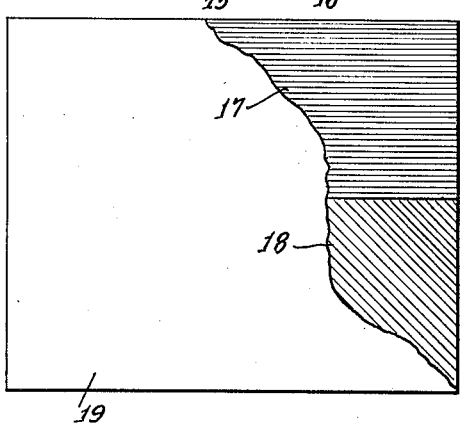
Fig. 3 is a view of a color screen which may be employed to produce color in a background or other portion of a scene to be registered on the film shown in Fig. 2.

The color camera containing the previously exposed color film having registered thereon the artificial scenery and the action in the foreground thereof may be set up as shown in Fig. 1 and focused upon the screen 2. The black and white positive of the ocean or background scene may now be placed in projector 8 and focused upon the screen 2. A color filter screen 5 may be set up, as illustrated in Fig. 1. At this stage of the method the color film in the color camera will have the appearance of the film shown in Fig. 2, wherein the images of the foreground objects and the actors have been registered, while the background 13 is not registered upon the film. The scene selected for illustrative purposes shows a cave 14 apparently upon a strip of beach 15 with a boat 16 apparently having been drawn along the beach and being unloaded by a pair of sailors shown in the foreground, it being understood that in the original exposure of the color film the sailors have been photographed during their motions in unloading the boat and transporting the various objects into the cave. The color screen 5 shown in Fig. 3 will have fitted thereon sections of color filter material 17 and 18, the section 17 being preferably of such value as is required to fit the blue sky of the black and white image of the ocean background, while the color filter 18 will be of such blue-green as will adequately color the water portions of such background picture.

Figure 4:
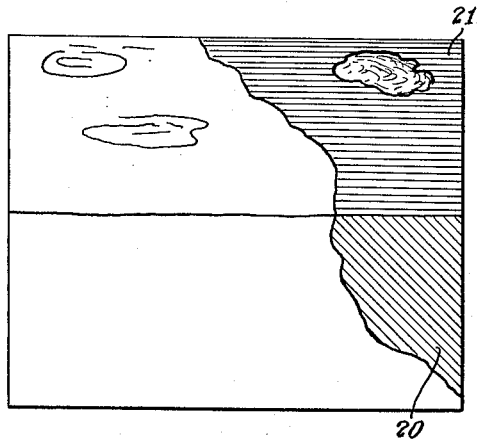
Fig. 4 is a view of a projection screen upon which there has been projected light from a film bearing certain portions of an image which it is desired to incorporate in a finished scene, this light and image passing through the color screen shown in Fig. 3.

If desired, a portion 19 of this screen 5 may be rendered opaque, though I find that it is not always necessary to render this portion of the screen opaque since the portion of the background scene which will be projected through this section of the screen 5 to register upon the screen 2 will be exposed to that part of the color film which has already been exposed under intense light, and substantially no further registration will occur in this part of the scene on the color film when it is again exposed. The black and white image of the background being projected through the screen 5 on to the screen 2 will produce an effect on the screen 2 such as that illustrated in Fig. 4 in which a reproduction of the moving water 20 and of the sky 21 is colored blue-green and blue, respectively, the intensity of the coloring being adjusted by the intensity of the color filter material 18 and 17, respectively.

Figure 5:
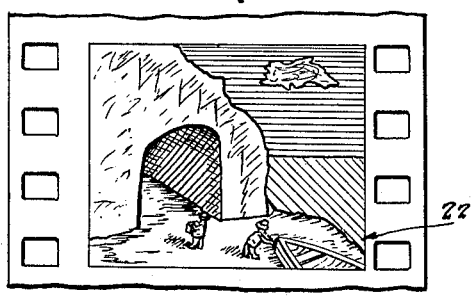
Fig. 5 is a view of the finished film shown in Fig. 2 after the remaining portions of the scene have been added thereto.

The projector 8 and the camera 1 are now operated in synchronism with each other at any desired speed to re-expose the color film at the same time that the black and white film in the projector 8 is projected upon the screen 2. The re-exposure of the color film will now cause the color background image to register upon the previously unregistered section 13 of the color film. Now the color film may be treated in the usual manner for the production of a colored positive, the resulting positive film having the appearance of the film section 22 shown in Fig. 5, wherein the foreground and action portion of the scene is reproduced in the desired color values and intensity and in which the background is also reproduced in its desired color values and intensity, the resulting positive film, when projected, comprising an artistic reproduction of the composite scene in which the colors are beautifully reproduced.

It will be noted that all of the advantages of production on an indoor sound stage has been retained by my process with the attendant reduction in expense while at the same time I have produced a film in which color backgrounds in any desired color values have been added to the film without disturbing the previously registered portions of the film and without sacrificing the economy of indoor production.

The value of my method will be most apparent when scenes requiring considerable action in the background, such as moving ocean water, falls, wind-blown foliage, and other rapidly moving objects must be shown in the background, such objects being readily and inexpensively photographed in black and white, but which require long expenditures of time and considerable expenditure of money to photograph in their natural colors in their natural locations.

It is therefore apparent that I have devised a method of producing color effects in color photography which has the advantages of being both inexpensive and the color values readily controlled and adjusted.

While in the foregoing description I have referred to the image which is to be projected as having been photographed in black and white, it will be understood by those skilled in the art that a colored film may be made of the original scene and this colored image may be projected upon the screen 2 with the colors added by means of the color filters on the screen 5 to intensify or alter the color values on the original color film and then the color film in the camera 1 may be used to photograph the screen 2 and its image with the additional color values added.

While I have illustrated and described the preferred form of the invention, I do not wish to be limited thereto except as defined in the appended claims:

1. The method of producing colored photographic effects in motion pictures, which consists in photographing with a color camera a scene having portions of said scene lighted with a predetermined light intensity to cause said color camera to register said portions of said scene, preventing said color camera from registering other portions of said scene, photographing another scene, adding portions of said other scene to the color film produced by said color camera by projecting said second scene upon a screen, coloring said image projected onto said screen or selected portions thereof with desired color values, and re-exposing said color film in a color camera to photograph said projected and colored image on said screen upon the unexposed portions of said color film.

2. The method of producing colored photographic effects in motion pictures, which consists in photographing with a color camera a scene having portions of said scene lighted with a predetermined light intensity to cause said color camera to register said portions of said scene, preventing said color camera from registering other portions of said scene, photographing another scene to produce a motion picture thereof adding portions of said other scene to the color film produced by said color camera by projecting said motion picture of said second scene upon a screen, coloring the images projected onto said screen or selected portions thereof with desired color values, and re-exposing said color film in a color camera to photograph said projected and colored images on said screen upon the unexposed portions of said color film, and adjusting the speed of said second exposure and the light intensity of said projected images and the color values added to said second images to cause said color film to register the image projected on said screen with desired color values without loss of definition of motion in said projected scene.

WILLIS H. O'BRIEN.